United States Patent Office 3,023,169
Patented Feb. 27, 1962

3,023,169
WATER TREATMENT COMPOSITIONS AND PROCESSES FOR THEIR PRODUCTION AND USE
Alfred O. Walker, Westchester, Ill., assignor to Nalco Chemical Company, a corporation of Delaware
No Drawing. Filed Feb. 9, 1959, Ser. No. 791,813
9 Claims. (Cl. 252—175)

This invention relates to improved solid water treatment compositions. More specifically, it relates to solid water treatment compositions which contain relatively large amounts of sodium aluminate.

Sodium aluminate has been recognized for a number of years as being an outstanding coagulant for treating aqueous systems containing suspended solids. It may be used either alone or in conjunction with other known coagulants such as, for instance, certain active clays, alum, iron salts, activated silica and the like to treat many types of waters to remove suspended matter. For most water treatment problems, sodium aluminate is desirably used in a relatively pure state, that is to say, the aluminate content should be in excess of 90% by weight or more.

When crude aluminates, such as those prepared directly from bauxite ores, are used, the insoluble impurities resulting from the manufacturing process tend to add extraneous non-active matter into the water treated. One of the difficult problems encountered in using low grade sodium aluminates in the treatment of water is that slime masses result from the insoluble impurities and tend to foul feeding equipment. If the sodium aluminate is in the form of a solid, the dissolution problems are quite difficult to overcome. In many cases they require special mixing equipment and handling techniques.

In the past it has been common to use crude sodium aluminate as concentrated solutions, e.g., about 20% to 40% by weight, but these have the disadvantage of throwing out insoluble contaminants which are difficult to keep in suspension. Hence the consistency of the products tend to vary from batch to batch. Also the concentrated liquid solutions of crude aluminate has the disadvantage of being strongly alkaline. Hence they are dangerous to operators when it becomes necessary to handle them for such operations as dilution, feeding, and the like.

It would be extremely beneficial if a sodium aluminate type coagulation product were available which could be simply manufactured and were relatively economical to use, yet did not have the several disadvantages inherent in the relatively impure sodium aluminates which are known to be not entirely satisfactory in the treatment of aqueous liquids in such processes as clarification and the like.

It has been found that a solid water-treating composition may be readily prepared from crude bauxite ores and sodium hydroxide by using certain manufacturing techniques which produce a product which has outstanding coagulation activity and which in many instances is superior to the results obtained when compared to refined sodium aluminate. In its simplest form, the products of the invention comprise from 74% to 85% by weight of sodium aluminate, with the total composition having an $Na_2O$ to $Al_2O_3$ molar ratio of 1.11:1 to 1.25:1. The balance of the materials in the finished composition are the insoluble impurities which are contained in the bauxite and are most commonly known as red mud. These impurities contribute immeasurably to the utility of the product in that they are present in the product in a state of subdivision such that at least 80% by weight of the particles are of colloidal size.

For a more comprehensive understanding of the invention it may be said that the preferred compositions contain from 74% to 85% by weight and preferably 80% to 85% by weight of sodium aluminate. The sodium oxide to alumina molar ratio is within the range of 1:1 to 1.25:1 and most preferably 1.18:1 to 1.23:1. The water-insoluble impurities contained in the final product should have at least 80% of the particles in a state of colloidal fineness; preferably at least 90% of the particles of the water-insoluble impurities should not be greater than 1 micron in diameter.

The compositions of the invention are prepared by digesting the crude bauxite ore in a relatively concentrated solution of sodium hydroxide and heating the mass to react the alumina to produce sodium aluminate and then concentrating the reaction product to produce a relatively concentrated solution of aluminate and the impurities contained in the bauxite and then drying the product to a moisture content which does not exceed 2.0% by weight of the finished product. The unusual properties imparted to the finished product are achieved by using certain specific manufacturing techniques which are critical in the control of the finished product. In the first instance, the bauxite ore should have an alumina content, expressed as $Al_2O_3$, of at least 57% by weight and preferably should be in excess of 60% by weight.

The insoluble impurities contained in the bauxite ore, which when processed in accordance with the present invention contribute to the activity of the finished product. Bauxite ore deposits are located throughout the world and vary somewhat from location to location. Since the chief active ingredient in the bauxite is alumina, it is desirable that the alumina content of the ore contain at least 57% by weight of alumina. The non-caustic reactive ingredients most commonly found in bauxite ores are such materials as silica, titania, iron oxide, calcium oxide, magnesium oxide, and water. For purposes of illustration, several typical bauxite ores that may be used in the process of the invention, in terms of their major constituents, are listed below in Table I:

TABLE I

| Country: Locality | Constituents, percent | | | | | |
|---|---|---|---|---|---|---|
| | $Al_2O_3$ | $SiO_2$ | $TiO_2$ | $Fe_2O_3$ | CaO, MgO | $H_2O$ |
| United States: Arkansas, Saline County | 58.60 | 2.34 | | 9.11 | | 28.68 |
| British Guiana: Yarikita River | 64.38 | 2.73 | .10 | .50 | | 32.29 |
| India: Jubbulpore Dist | 57.15 | 2.00 | 8.60 | 2.75 | | 29.13 |
| France: Herault | 58.6 | .8 | 2.80 | 26.2 | | 21.1 |
| Var | 57.60 | 2.80 | 3.10 | 26.30 | .40 | 10.8 |
| Italy: Abruzzo | 57.50 | 2.79 | 1.27 | 26.55 | | 11.71 |
| Campagna | 58.40 | 1.27 | | 24.12 | | 13.11 |
| Yugoslavia: Dalmatia | 57.85 | .89 | | 26.82 | | 19.97 |
| Surinam: Surinam River | 64.6 | 1.20 | | 1.2 | | 31.8 |
| Gold Coast: Mt. Ejuanema | 59.05 | .62 | 1.66 | 12.19 | | 26.47 |

A preferred starting bauxite is the ore of the type deposit found in the area near the Surinam River in South America. A more detailed analysis of this ore is presented below:

*Typical Analysis*

| | | |
|---|---|---|
| $Al_2O_3$ | 61%–62% | 60% min. |
| $Fe_2O_3$ | 1.5%–2.0% | 2% max. |
| $TiO_2$ | 2.8%–3.2% | |
| $SiO_2$ | 1.8%–2.2% | |
| Loss on ignition ($H_2O$ and organic) | 31%–32% | |
| Free moisture | 2% or less | 3% maximum (penalty calculated on excess over 2% $H_2O$). |

The above represents an alumina segment of the entire deposit; hence, the slight discrepancy from the prior general analysis.

It is well known that there have been numerous methods and proposals for making alkali metal aluminates from bauxite ore. For the most part, these methods may be divided into the so-called wet or dry processes. The process used in practicing this invention may be considered as a wet process. The prior art wet processes have employed a large number of reaction conditions, temperature ranges and the like to produce finished aluminates. For the most part, however, past emphasis has been on getting higher yields of sodium aluminate with the elimination of the insoluble impurities or red mud from the final product. When large scale production methods are employed using these prior art methods, it is necessary to use such devices as filtration, decantation, centrifuging and the like to remove the insoluble impurities to upgrade the aluminate content of the finished product. The so-called insoluble impurities or red mud that remain from such processes present a disposal problem and are not salable commercially since they have no use of any importance.

In the initial manufacturing step, sodium hydroxide is made up into a concentrated solution of from 45% to 70% by weight. The concentration of the caustic should be as high as possible, yet should not be so high that the viscosity of the solution is such as to render the working and subsequent drying of the product difficult. The best results are obtained when the caustic content of the solution is between about 45% and 55% by weight, with excellent results being obtained when the caustic concentration is at about 45% to 50% by weight. The caustic solution is then heated to a temperature which should exceed at least 260° F., and preferably the minimum temperature should be at least 280° F. A general rule is that the more concentrated the solution of alkali, the greater will be the minimum temperature to achieve a product having the necessary properties. When the alkali concentration is in the preferred range, that is between 45% and 50% by weight, the temperature should be elevated to about the boiling point of the solution, which is in the case of 50% sodium hydroxide between 280° and 285° F. In any event, the temperature should be within the ranges specified and should not be allowed to drop prior to the addition of the bauxite.

When the caustic solution reaches the desired temperature, the crude bauxite ore is added to the sodium hydroxide with sufficient agitation to keep all of the bauxite from settling. If the temperature ranges are within those specified above, the caustic will react with the alumina present to form sodium aluminate within a very short period of time varying from several minutes to not longer than several hours. As a general rule, the higher temperatures will more rapidly cause the reaction to occur. After the reaction of the sodium hydroxide with the alumina in the bauxite, the stirring is continued to assure that the insoluble impurities or red mud of the bauxite are uniformly suspended throughout the reaction mass. After a homogeneous reaction mass is achieved, the temperature is increased to cause a concentration of the liquor to occur by the evaporation of water. The evaporation step is conducted at temperatures which approximate those of the starting caustic solution just prior to the addition of the bauxite.

When the preferred ratios of reactants and temperature conditions are employed, the concentration process should continue with agitation being constantly maintained until the reaction mass attains a specific gravity of at least 1.600, and preferably the gravity should be increased until it is about 1.800, at which point the reaction may be considered as complete, and the resultant product is then transferred from the reaction vessel to a suitable drying device where the product is further treated to remove any excess water present and to dry the product until a moisture content of not greater than 2.0% by weight is reached.

The reaction mass may be concentrated to higher gravities, but they are extremely difficult to handle in the drying step.

One of the most striking features of the above process is that, when the temperature of the starting sodium hydroxide solution is within the ranges specified and the concentration process is carried out in accordance with the general procedure outlined above, it was found that the so-called insoluble impurities or red mud tended to become more uniformly dispersed into the reaction mass and appeared to be dissolved. In effect, what occurs is that the insoluble impurities become more finely divided into the reaction mass, with a large part of the material being in a state of colloidal subdivision. This fineness of particle size is carried over into the finished product.

The finished product contains substantial quantities of particles of one micron or less in diameter, which particles tend to contribute greatly to its coagulation activity. In a preferred form, the product is dried under such conditions that it is in the form of fine, uniform granules which are in a particle size range of from 20 to 40 U.S. mesh standard sieve size. This granulation may be accomplished by several well-known methods and are dependent upon the particular drying process employed. Thus, mixing and tumbling with controlled moisture conditions, grinding, sieving, and the like may be used to produce granules of the size range specified above.

As will be shown later, if the temperature of the sodium hydroxide solution is not elevated to the ranges indicated, the resultant product will contain a large number of particles which are greater than colloidal fineness and which, upon use in water treatment operations, will tend to produce insolubles which interfere with the activity of the alkali metal aluminate present and will foul operating equipment such as feeders, mixers, and the like.

The compositions of this invention not only provide unique water treating agents but utilized all the values found in the bauxite ore from which the compositions are produced. In studying various aluminate compositions produced from bauxite ore in which attempts were made to utilize all of the ore's components, it was discovered that the insoluble impurities when used in conventional coagulation operations tended to produce a problem in that they would clog feeders, form slimes and masses in dilution equipment and the like which were troublesome and tended to interfere with the utility of the finished products. The insolubles also interfere with the solubility of the sodium aluminate. In feeding solid products of the type with which this invention is concerned, it is customary to add the product to a flowing stream of water or to bubble water into a container which holds a specified amount of the product. As the alkali metal aluminate goes into solution, compositions not made in accordance with the invention tend to form sludges or masses resulting from the insoluble impurities. Compositions of this invention, however, will uniformly dissolve and disperse into the water, leaving very small amounts of visible residue. They form liquid solutions which are extremely valuable in the clarification of aqueous liquids.

To determine the effect of the so-called insoluble impurities in feeding equipment and to determine the dissolution rate and uniformity of the product, a simple test method was devised which, for the most part, duplicated most plant mixing or diluting operations. This particular process may be considered as a method for determining cold water insolubles in a so-called crude grade of an alkali metal aluminate produced from bauxite ore. The general method was as follows:

PRINCIPLE OF METHOD

A weighed portion of the product is transferred to a separatory funnel and water is allowed to upflow through the funnel for a period of time at a predetermined rate. The insolubles are then filtered off and ignited to a constant weight to obtain the percent insolubles in cold water.

PROCEDURE

A separatory funnel is set in a ring stand in a sink. Water is flowed into the bottom of the funnel by placing a rubber tube from the water source to the bottom of the separatory funnel. Five thousand grams of the composition are weighed and transferred to a 250-ml. beaker. One hundred ml. of water are added to the beaker and stirred for a few minutes to thoroughly wet all the product. The stop-cock on the separatory funnel is then opened and water flow started up through the funnel at a rate of about 250 ml. per minute. The product from the beaker is transferred into the separatory funnel. The beaker is washed several times with water. This transfer must be completed before the water level in the funnel reaches the top. After all the solids have been transferred, the water flow is adjusted to a rate which will lift the top of the bed of solids 2–3 inches off the bottom of the funnel. (This will give the proper flow rate.)

The water is allowed to flow up through the solids for 15 minutes. The flow of water is then stopped by closing the top cock on the separatory funnel.

The solids are then allowed to settle on the bottom and if the upper layer of water is clear, decant about half of the liquid; if not clear, filter off the solids on 40 Whatman filter paper and wash several times with cold distilled water. The paper and solids are then transferred to a to a tared platinum crucible and ignited at 800° C., for one-half hour. The crucible and contents are allowed to cool and then are reweighed. The temperature of the water used to perform the above operation should be maintained at about 75° F.

CALCULATIONS $$\frac{\text{Mg. of insoluble}}{5000} \times 100 = \text{Percent cold water insolubles}$$

Several experimental batches were prepared to try various reaction conditions in an attempt to determine the optimum conditions for producing a satisfactory sodium aluminate treatment composition which utilized the red mud component of the starting ore. The results of these experimental tests are shown below in Table II:

cated that at least 95% of the particles were one micron or less in diameter. Thus it may be readily surmised that although the water insoluble impurities are still present in the finished product, the majority of them are in a state of colloidal subdivision. Thus aqueous solutions of the finished product contain a major portion of sodium aluminate and a substantial amount of finely divided colloidal size particles which tend to make the product an outstanding coagulant since it provides a floc nuclei to which the particles to be coagulated attach and are then reacted upon by the sodium aluminate.

To illustrate the coagulation efficiency of the compositions, the following example is given:

EXAMPLE I

The test water was a plant water used to produce paper which was drawn from a natural source and had a relatively large amount of turbidity. The first test consisted of using 10.6 parts per million of a 33% solution of a crude alkali metal aluminate in combination with 5.8 parts per million of alum. The coagulation test method so far as agitation time and the type of equipment used was the same as that described in the article Polyelectrolytes as Coagulants and Coagulant Aids, Carl E. Johnson, Ind. & Eng. Chem., Vol. 48, p. 1080 (1956). The particular combination described above produced large quantities of floc but it was very weak and did not pick up the turbidity present. The settling of the floc was extremely poor. Using the same water in another test, 3.2 parts per million of Composition IV, Table II, and 4.5 parts per million of alum were tested. The resultant floc formed during the test was far superior to that formed with the other aluminate product, and clarification was excellent in comparison with the poor clarification afforded by the other product. Other series of tests were run in which the pH was varied over four pH points in each direction. As a result of these tests the floc formed by the compositions of the invention were far superior over all pH ranges to those produced by the other material. In the extremes of the pH levels used, the other product failed to give satisfactory flocs at both

TABLE II

| Composition number | Grams of NaOH | Percent NaOH | Grams of bauxite | Reaction temp, °F. | Finished gravity | $Na_2O/Al_2O_3$ | Percent cold $H_2O$ insoluble | Percent caustic insoluble | Percent moisture |
|---|---|---|---|---|---|---|---|---|---|
| I  | 170 | 51.25 | 191 | 220 | 1.600 | .97  | 25   | 16.0 | 1.0 |
| II | 179 | 48.75 | 175 | 225 | 1.603 | 1.07 | 23.7 | 9.1  | 1.2 |
| III| 178 | 49.0  | 156 | 280 | 1.750 | 1.20 | 11.0 | 5.9  | 1.1 |
| IV | 178 | 49.0  | 150 | 280 | 1.800 | 1.24 | 7.9  | 5.7  | 1.4 |

As can be seen from the above, the ratio of the reactants and reaction conditions must fall within those specified if a product having satisfactory characteristics is to be obtained.

From the above it will be seen that the cold water insolubles formed, when the reaction conditions are not in accordance with those specified, are extremely high. When the reaction conditions of the invention are employed, there is a substantial decrease in the cold water insolubles and, as will be shown later, the coagulation activity of the product is greatly improved. The above table also shows the amount of caustic insoluble materials. This refers to those materials which are insoluble in a 1-normal solution of sodium hydroxide. This is a well-known test for checking the purity of alkali metal aluminates.

Using the caustic insoluble method to make sure that all of the aluminate has been dissolved, several typical compositions of this invention were dissolved in 1-normal caustic and the insoluble impurities were removed by filtration and then subjected to a particle size count. The result of this particle size distribution analysis indiends of the pH range. In the above tests the dosages were so controlled that the aluminate content in each test was equivalent.

The compositions of the invention may be used in treating low turbidity waters of the type commonly found in municipal systems and other similar types of water treatment situations. They are particularly effective in clarifying waters treated in lime soda softeners and are extremely useful in treating paper mill process waters where it is desirable to use an alkaline coagulant which not only contributes to the clarity of the water but also will furnish alkalinity to the water which is desirable in most paper making processes. It should be stressed that the compositions of the invention are unique chemical materials which have advantages not achieved by using other compositions which may contain sodium aluminates.

The compositions of the invention are economical to produce and are readily dissolved by using conventional mixing equipment. When they are in the form of granules the product is free-flowing and does not tend to cake under normal conditions of storage in most environmental conditions.

The invention is claimed as follows:

1. A solid granular water treatment composition consisting essentially of from 74% to 85% by weight of sodium aluminate, and impurities consisting of water insoluble residues of the reaction between an alkali metal hydroxide and bauxite ore, which residues are commonly called red mud, said impurities being finely divided so that at least 80% of the particles are of colloidal size, said total composition having an $Na_2O$ to $Al_2O_3$ molar ratio of from 1.11:1 to 1.25:1.

2. A solid granular water treatment composition consisting essentially of 80% to 85% by weight of sodium aluminate, and impurities consisting of water insoluble residues of the reaction between an alkali metal hydroxide and bauxite ore, which residues are commonly called red mud, said impurities being finely divided so that at least 90% of the particles are no larger than 1 micron in diameter, said total composition having an $Na_2O$ to $Al_2O_3$ molar ratio of from 1.18:1 to 1.23:1.

3. The composition of claim 2 where the product is in the form of granules which are in the particle range of from 20 to 40 mesh U.S. standard sieve size.

4. The process of producing a water treatment chemical from bauxite which comprises the steps of heating a 45% to 70% by weight solution of an alkali metal hydroxide to a temperature of at least 275° F., adding thereto with agitation a bauxite which contains at least 57% by weight of alumina to produce a reaction mass having an $Na_2O$ to $Al_2O_3$ ratio between 1.11:1 and 1.25:1, continuing the process whereby the alumina present in the bauxite is substantially converted to sodium aluminate and the water insoluble residual products of said reaction are uniformly suspended throughout the reaction mass, adjusting the specific gravity of the reaction mass to between 1.600 and 1.850, and then drying the resultant product to a moisture content of not more than 2.0% by weight.

5. The process of producing a water treatment chemical from bauxite which comprises the steps of boiling a 50% by weight solution of sodium hydroxide, adding thereto with agitation bauxite in an amount sufficient to produce an $Na_2O$ to $Al_2O_3$ ratio between 1.1:1 and 1.23:1, continuing the reaction to evaporate the water present in the reaction mass until the specific gravity of the product is about 1.800, and then drying to a moisture content of not more than 2.0% by weight, and granulating the resultant product.

6. The process of coagulating and settling finely-divided solids which are suspended in an aqueous medium which comprises the steps of treating such suspended solids with a coagulating and settling amount of a water treating composition consisting essentially of from 74% to 85% by weight of sodium aluminate, and impurities consisting of water insoluble residues of the reaction between an alkali metal hydroxide and bauxite ore, which residues are commonly called red mud, said impurities being finely divided so that at least 80% of the particles are of colloidal size, said total composition having an $Na_2O$ to $Al_2O_3$ molar ratio of from 1.11:1 to 1.25:1.

7. The process of coagulating and settling finely-divided solids from an aqueous system which comprises treating such systems with a coagulating amount of a solid, granular water treatment composition consisting essentially of 80% to 85% by weight of sodium aluminate, and impurities consisting of water insoluble residues of the reaction between an alkali metal hydroxide and bauxite ore, which residues are commonly called red mud, said impurities being finely divided so that at least 90% of the particles are no larger than 1 micron in diameter, said total composition having an $Na_2O$ to $Al_2O_3$ molar ratio of from 1.18:1 to 1.23:1.

8. In the process of softening water using a lime-soda softening technique the steps of adding to the water during the softening process to improve floc formation and settling a solid water treatment composition consisting essentially of from 74% to 85% by weight of sodium aluminate, and impurities consisting of water insoluble residues of the reaction between an alkali metal hydroxide and bauxite ore, which residues are commonly called red mud, said impurities being finely divided so that at least 80% of the particles are of colloidal size, said total composition having an $Na_2O$ to $Al_2O_3$ molar ratio of from 1.11:1 to 1.25:1.

9. In the process of softening water using a lime-soda softening technique the steps of adding to the water during the softening process, to improve floc formation and settling, a solid, granular water treatment composition consisting essentially of 80% to 85% by weight sodium aluminate, and impurities consisting of water insoluble residues of the reaction between an alkali metal hydroxide and bauxite ore, which residues are commonly called red mud, said impurities being finely divided so that at least 90% of the particles are no larger than 1 micron in diameter, said total composition having an $Na_2O$ to $Al_2O_3$ molar ratio of from 1.18:1 to 1.23:1.

References Cited in the file of this patent

UNITED STATES PATENTS

| | | |
|---|---|---|
| 1,620,332 | Evans | Mar. 8, 1927 |
| 2,159,843 | Davies | May 23, 1939 |

UNITED STATES PATENT OFFICE
CERTIFICATE OF CORRECTION

Patent No. 3,023,169                   February 27, 1962

Alfred O. Walker

It is hereby certified that error appears in the above numbered patent requiring correction and that the said Letters Patent should read as corrected below.

Column 5, line 5, for "grams" read -- milligrams --.

Signed and sealed this 10th day of December 1963.

(SEAL)
Attest:

ERNEST W. SWIDER

Attesting Officer

EDWIN L. REYNOLDS

Acting Commissioner of Patents